United States Patent Office 2,963,425
Patented Dec. 6, 1960

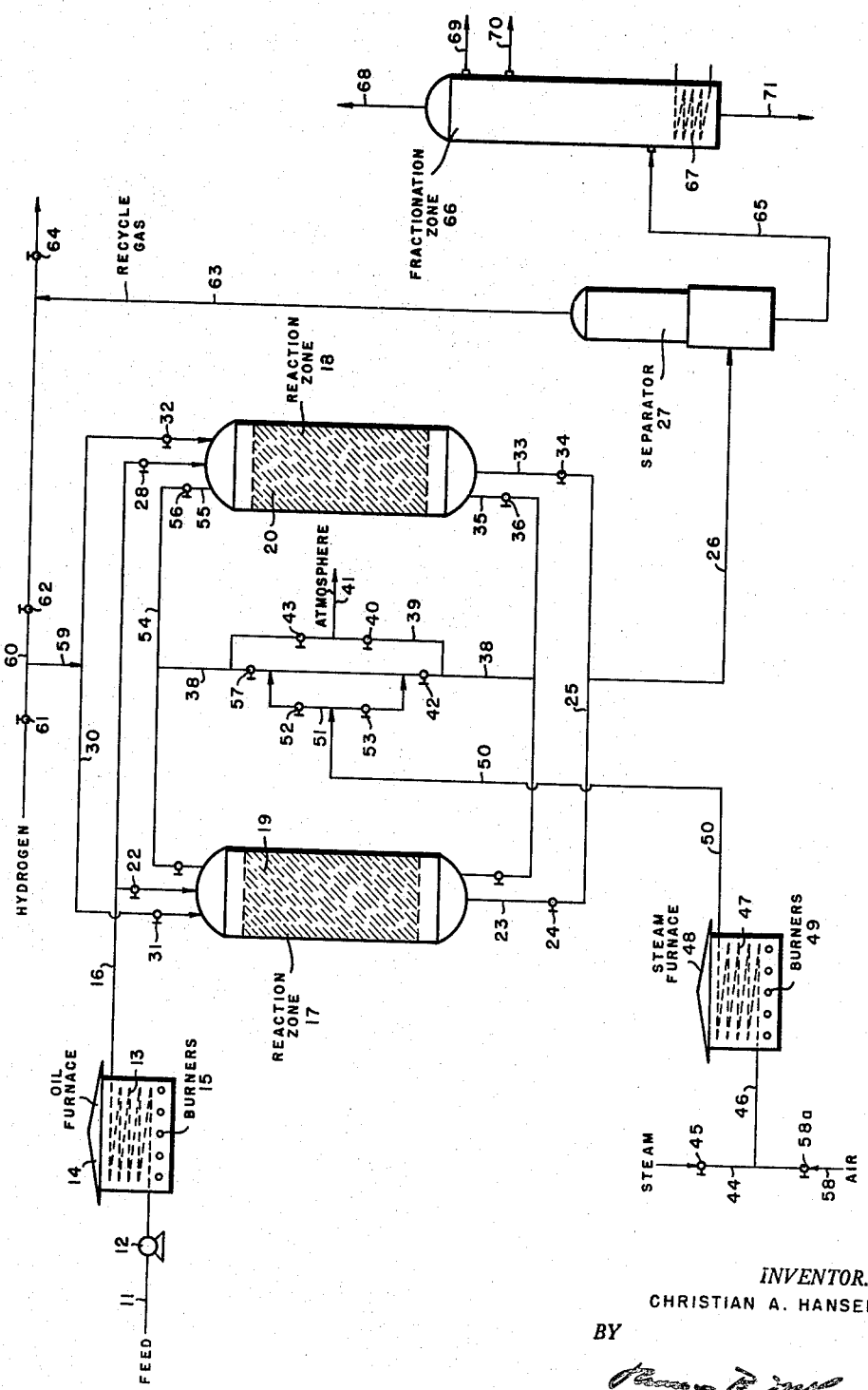

2,963,425

REGENERATION AND REUSE OF CATALYST

Christian Andreas Hansen, Jr., Baytown, Tex., assignor, by mesne assignments, to Esso Research and Engineering Company, Elizabeth, N.J., a corporation of Delaware Filed Aug. 27, 1958, Ser. No. 757,496

8 Claims. (Cl. 208—264)

The present invention is directed to a method for regenerating catalyst employed in hydrogen treatment of petroleum fractions. More specifically the invention is directed to regeneration of a molybdenum-containing catalyst employed in hydrogen pretreatment of petroleum fractions boiling in the gasoline, gas-oil and lubricating oil range. More particularly the invention has to do with restoring the activity of a catalyst employed in hydrogen pretreatment operations and to eliminating the pressure drop in a hydrogen contacting zone wherein the catalyst has become fouled with carbonaceous deposits.

This application is a continuation-in-part of Serial No. 558,517, now abandoned, filed January 11, 1956, for Christian A. Hansen, Jr. entitled "Regeneration of Catalyst."

The present invention may be briefly described as a method for regenerating molybdenum catalyst which has become deactivated by deposition of carbonaceous material thereon in the hydrogen treatment of a petroleum fraction boiling in the gasoline, gas-oil and lubricating oil range. The hydrogen treatment is conducted at a temperature of about 450° to about 750° F., at a pressure in the range of about 50 to about 800 pounds per square inch gauge and the mixture of hydrogen and petroleum fractions is contacted with the catalyst. In the present invention contact of the catalyst with the petroleum fraction is discontinued and contact of the catalyst with the hydrogen is continued for a time sufficient to remove any of the petroleum fraction remaining on the catalyst in a liquid phase. Thereafter the contacting of the catalyst with hydrogen is discontinued and the catalyst is contacted with steam until the catalyst is free of the petroleum fraction. The amount and temperature of the steam in contact with the catalyst are increased until the temperature of the catalyst is approximately 850° F. Carbonaceous material is then burned from the catalyst in a combustion operation by providing in the steam a sufficient amount of free oxygen to remove the carbonaceous material from the catalyst and to provide a catalyst temperature no greater than approximately 1000° F. Oxygen is then removed from the steam and contact of the catalyst with the steam for approximately 30 minutes is then continued. The steam contacting operation is discontinued and the burned catalyst is again contacted with hydrogen while reducing the temperature of the catalyst to a temperature in the range from about 500° to about 750° F. The catalyst thus has its activity restored; the pressure drop of the reaction zone in which the catalyst is maintained is substantially reduced; and the catalyst is then again contacted with a mixture of hydrogen and petroleum fraction.

The catalyst employed in the practice of the present invention is suitably a molybdenum-containing catalyst such as molybdenum oxide on alumina, preferably a purified alumina such as substantially silica-free alumina. Other molybdenum-containing catalysts may be employed such as cobalt molybdate on substantially purified alumina, molybdenum sulfide on alumina, molybdenum blue (which is $MoO_3$) on alumina and other molybdenum-containing catalysts may be used.

The petroleum fraction employed as a feed stock in the practice of the present invention may boil in the range from about 100° F. to about 900° F. and may be a petroleum fraction in the gasoline, gas-oil, and lubricating oil range. Gas-oil, heating oil and lubricating oil fractions are preferred feed stocks.

The hydrogen treatment is conducted at a temperature in the range from about 450° F. to about 700° F. and at a pressure in the range from about 50 to about 225 pounds per square inch gauge. These conditions are suitable for hydrogen treatment of gasoline and gas-oil hydrocarbons.

When lubricating oil fractions are subjected to hydrogen treatment, the temperature may range from about 500° to about 750° F. and pressures may range from about 150 to about 800 pounds per square inch gauge.

In the hydrogen treatment operation, the petroleum fraction may contact the catalyst at a liquid space velocity in the range from about 0.25 to about 10 volumes of the fraction per volume of catalyst per hour.

Hydrogen is employed and is suitably used in the range from about 200 to about 2000 standard cubic feet per barrel of the fraction during the hydrogen treatment operation.

The amount of oxygen employed in the steam for regeneration is no greater than about 1 mol percent. Thus, the range may be from about 0.3 to about 1.0 mol percent. A preferred amount of oxygen may suitably be in the range from about 0.5 to about 0.9 mol percent in a steam-air mixture used for regeneration. Thus, a suitable amount of air is used to provide the required amount of oxygen.

The present invention will be further illustrated by reference to the drawing in which the single figure is a flow diagram of the preferred mode. Referring now to the drawing, numeral 11 designates a charge line by way of which a petroleum fraction of the type mentioned is introduced into the system from a source not shown and pumped by way of pump 12 through a heating coil 13 arranged in a furnace 14 provided with a heating means such as gas burners 15. The heated oil is then discharged from the furnace 14 by way of line 16 and is discharged into either one or both of reaction zones 17 and 18 containing a bed of catalyst such as 19 and 20 of the type mentioned before. For purposes of this description, it will be assumed that the feed stock is being discharged by line 16 and branch line 21 controlled by valve 22 into reaction zone 17 and the products therefrom are being discharged by line 23 controlled by valve 24 into manifold 25 and thence by line 26 into a separation zone 27. Valve 28 in line 29 is closed and thus the feed stock is not charged thereto. Hydrogen is introduced into reaction zone 17 through manifold 30 controlled by valve 31. Hydrogen is also introduced into reaction zone 18 through manifold 30 controlled by valve 32.

For purposes of this description, it may be assumed that reaction zone 18 has been cut out of the reaction cycle by closing valve 28 in line 29. This leaves hydrogen continuing to flow into reaction zone 18. The hydrogen is continued therein for about 1 hour, the amount of hydrogen being in the range from 200,000 to about 400,000 standard cubic feet per hour. The velocity of the hydrogen through the catalyst bed may range from about 1 to about 5 feet per second. Good results have been obtained at a hydrogen velocity of 3 feet per second. Since the products would ordinarily issue from reaction zone 18 through line 33 controlled by valve 34, valve 34 may be closed which allows hydrogen employed as purge in zone 18 to issue therefrom through line 35 controlled by valve 36 in manifold 37 and then discharged therefrom by way of line 38, manifold 39 controlled by valve 40 and exhausted by way of line 41, valve 42 in line 38 being closed and valve 43 in manifold 39 also being closed. Since the oil in and on the catalyst is valuable, it may be recovered by allowing valve 34 to remain open, during the hydrogen purge, allowing the hydrogen and oil to discharge by line 26 to separator 27. Hydrogen flow is continued through reaction zone 18 until the reactor and the catalyst contained therein are free of liquid oil. Stream is then introduced into the reactor by way of line 44 controlled by valve 45 which introduces the steam by way of line 46 through heating coil 47 in steam furnace 48 which is provided with a heating means such as burners 49. While this steaming operation is conducted, the furnace 48 is not fired and the steam is introduced by way of line 50 into manifold 51 controlled by valves 52 and 53 such that the steam may flow by way of line 38 into manifold 54 and thence by way of line 55 controlled by valve 56 into zone 18, valve 57 in line 38 being open such that the steam may be flowed downflow through the reaction zone 18 and outwardly therefrom by way of line 35, line 38, manifold 39 and line 41 by suitable manipulation of the several valves therein, valve 42 in line 38 being closed.

After the reaction zone has been steamed a sufficient length of time, for about 2 hours, at a steam velocity through the bed of about 0.5 to about 2 feet per second to free the reaction zone 18 and the catalyst therein from hydrocarbon vapors, the furnace 48 is fired and steam is brought up to the desired temperature of approximately 850° F. Thereafter air is slowly introduced into line 46 in admixture with the steam introduced by line 44 through line 58 controlled by valve 58a. During the introduction of steam, the temperatures in reaction zone 18 are observed closely such that the temperatures therein are not increasing rapidly. The air rate is increased until it is about 1 mol percent of oxygen in the steam-air mixture flowing from line 46 into furnace 48 and thence by line 50, manifold 51, line 38, manifold 54 and line 55 to reaction zone 18 at a velocity of the mixture of about 2 to 5 feet per second. At this level of oxygen concentration, the catalyst bed 20 may have a temperature which will exceed the steam-air temperature by about 150° F. The temperatures are maintained in the catalyst bed 20 to keep them below 1000° F. since, if the temperatures should exceed a temperature greater than 1000° F., the catalyst may be permanently deactivated. The oxygen in the steam-mixture causes a combustion operation to proceed which burns off the carbonaceous and other burnable deposits from the catalyst. After substantial amounts of the carbonaceous and other deposits have been removed primarily from the surface of the catalyst, the temperatures in the catalyst bed approach the temperatures of the inlet steam-air mixture. When the temperature has become stabilized in the catalyst bed, the free oxygen concentration in the gas being employed for combustion may be increased to about 2 mol percent without fear of exceeding the desired temperature in the bed.

When regeneration is complete, valve 58a is closed in line 58 to remove the oxygen from the steam and steaming is continued for approximately 30 minutes. Thereafter the steam valve 45 is closed and the steam outlet temperature is reduced and the burners 49 extinguished. The reaction zone 18 is then contacted with hydrogen gas for approximately 30 minutes, this hydrogen being introduced into manifold 30 by way of line 59 connecting into line 60 in an amount in the range from about 200,000 to about 400,000 cubic feet per hour; the velocity being the same as that given before. Substantially pure hydrogen may be introduced into line 60 by opening valve 61 connecting line 60 to a source of hydrogen or recycle gas may serve as the hydrogen-containing gas which may be provided at least in part by opening valve 62 which connects line 60 to recycle gas line 63 which connects into the top of separator 27. If the recycle gas exceeds the amount of hydrogen-containing gas required for both reaction and regeneration, then valve 64 in line 60 may be opened for discharge of hydrogen. While the hydrogen is again being introduced into reaction zone 18, the reaction zone is cooled to approximately reaction temperature which, in the case of fuel oil, may be from about 500 to about 650° F. Hydrogen pretreatment in accordance with the present invention, as has been described, results in high initial activity after regeneration.

Meanwhile, the reaction zone 17 has been on the reaction cycle and the products in separator 27 are separated into gaseous and liquid products with the gaseous products being recycled by line 63. The liquid product is discharged by line 65 into a fractionation zone 66 which is illustrated as a single fractional distillation tower provided with all auxiliary means conventional to such towers which will include vapor-liquid contacting means such as bell cap trays and the like, means for inducing reflux and condensing and cooling means. While a single fractional distillation tower is illustrated, a plurality of fractional distillation towers may be used.

In any event, zone 66 is provided with a heating means illustrated by a steam coil 67, and overhead line 68 for removing components boiling below the boiling range of the feed, line 69 and line 70 for separating the product into separate fractions and line 71 for discharge of components heavier than the feed.

After the reaction zone 17 has been on the reaction cycle for a period of time which may range from about 1 to about 6 months, preferably 1 to 2 months, the carbonaceous deposits on the catalyst increase to about 5% to about 10% by weight of carbon (based on the catalyst) and where the hydrogen treatment of the feed petroleum fraction is being impaired. When this occurs, the feed stock is discontinued into zone 17 by closing valve 22 and the feed is introduced into zone 18, which has been reactivated, by opening valve 28. Hydrogen continues into zone 17 through manifold 30 and valve 31 and outwardly therefrom by manifold 37, line 38, manifold 39, valve 40 and line 41. Valve 24 in line 23 is closed and valve 36 in line 35 is also closed. Valve 34 in line 33 is opened such that the product from reaction zone 18 may be routed into separator 27 and fractionator 66. The sequence of operations described for reaction zone 18 is then employed for reaction zone 17 until the catalyst has been reactivated by the operations including hydrogen contact, steaming, burning, steaming, hydrogen contact and then resumption of the hydrogen treatment of the feed stock.

Since the reactivation or regeneration treatment is only necessary after 1 to 6 months operating period, there will be long operating periods when both reaction zones 17 and 18 will be operating and there will be only short periods of time, approximately 24 hours, when one reaction zone will be off of the reaction cycle.

The present invention is quite advantageous and useful in that it provides a method for reactivating and regenerating catalyst which restores the activity of the catalyst and reduces the pressure drop through the reaction zone.

In order to illustrate the regeneration of a catalyst which had been employed in hydrofining of a fuel oil, hydrocarbon vapors from a furnace, such as 14, were bypassed around the particular reactor to be regenerated. This left the hydrogen gas flowing into the reactor. The hydrogen contact was continued downflow for about 1 hour until the reactor was free of liquid oil. Hydrogen was then discontinued by closing the reactor outlet valve and then the reactor inlet valve. The reactor was then steamed out downflow with steam for about 2 hours under a pressure of about 150 pounds per square inch gauge until the reactor was free of hydrocarbon. The 150 pounds per square inch gauge steam at about 350° F. was flowed through a superheater such as 48 which will provide 5000 B.t.u. per hour steam at a rate of about 10,000 pounds per hour. The steam rate was adjusted to a desired level which may range from about 15,000 to about 20,000 pounds of steam per hour. This steam was passed upflow through the reactor and outwardly therefrom. After firing the steam superheater, the steam was brought to a temperature of about 850° F. and then air was slowly introduced into the inlet steam. Reactor temperatures were watched closely such that they did not increase rapidly and the air rate was increased until there was about 1 mol percent oxygen in the inlet air steam mixture. When the oxygen concentration in the mixture reaches this level, the bed temperatures will be about 150° F. higher than the steam-air mixture. The bed temperatures are closely observed and maintained below 1000° F. since above this temperature localized hot spots in the catalyst bed might result in permanent catalyst deactivation. After the surface deposits have been removed by burning from the catalyst, the temperatures of the catalyst bed approach the temperature of the steam-air mixture. Regeneration may then be speeded up by increasing the oxygen content of the steam-air mixture. After regeneration was completed, air was cut out of the steam and the steaming was continued for approximately 30 minutes. Steam was shut off and the steam outlet temperature reduced and the fires extinguished in the steam furnace.

Hydrogen was then introduced to flow downwardly through the catalyst for approximately 30 minutes while the bed was cooled to approximately reaction temperatures. Oil is then returned to the reactor and the hydrogen treatment operation of the feed resumed.

The following table illustrates the sequence of operations, the temperatures of the bed and the pressures in the bed:

Table I

| Operation | Reactor Bed Temp., ° F. | Reactor Pressure, p.s.i.g. |
|---|---|---|
| Hydrofining | 500–700 | 150–225 |
| Preliminary hydrogen purge | 400–600 | 150–225 |
| Downflow steam-out | 330–500 | 10–50 |
| Upflow steam-out | 330–850 | 10–20 |
| Surface decoking | 900–1,000 | 10–20 |
| Remaining decoking | 850–900 | 10–20 |
| Upflow steam-out | 800–850 | 10–20 |
| Hydrogen purge | 500–800 | 150–225 |

Total time for regeneration is approximately 24 hours.

A catalyst such as has been described hereinbefore, which had been used in hydrofining a light crude naphtha fed thereto at a feed rate of 15,300 barrels per day at a space velocity of 2.4 v./v./hr. and at a reactor outlet temperature of 646° F., at 135 p.s.i.g., was regenerated in accordance with the present invention. During the regeneration, temperatures during burning did not exceed 960° F. and the air rate was adjusted to provide 0.48 mol percent of oxygen in the air-steam mixture at the start of the regeneration. This was increased to 0.8 mol percent maximum during the regeneration. The pressure drop across the reaction zone prior to regeneration was 53 pounds per square inch and after regeneration was 28 pounds per square inch gauge. Data from the regeneration operation are presented in the following table:

Table II

| Reactor Press. (Approx.), p.s.i.g. | Reactor Bed Temperatures, ° F. | | | | | Regenerator Furnace Outlet, ° F. | Steam Rate, Lbs. per Hour | Steam+Air Rate s.c.f./hr. (60° F., 1 atm.) | Mol Percent $O_2$ in Mix. |
|---|---|---|---|---|---|---|---|---|---|
| | 1 | 2 | 3 | 4 | 5 | | | | |
| 20 | 760 | 740 | 750 | 920 | 940 | 820 | 19,750 | 425,480 | 0.48 |
| | 900 | 875 | 830 | 930 | 1,000 | 898 | | | |
| | 920 | 900 | 860 | 960 | 960 | 850 | | | |
| | 945 | 920 | 910 | 925 | 930 | 835 | | | |
| 20 | 945 | 920 | 910 | 925 | 940 | 836 | 19,750 | 432,500 | 0.80 |
| | 962 | 960 | 940 | 840 | 850 | 847 | | | |
| | 900 | 920 | 865 | 815 | 825 | 847 | | | |
| | 840 | 875 | 860 | 820 | 825 | 840 | | | |
| 20 | 820 | 855 | 820 | 830 | 870 | 880 | 20,000 | 437,250 | 0.78 |
| | 820 | 870 | 815 | 860 | 870 | 886 | | | |
| | 810 | 860 | 810 | 855 | 860 | 860 | | | |

The regenerated catalyst was then employed again in hydrofining a light crude naphtha at a feed rate of 17,850 per day, at a space velocity of 2.8 v./v./hr., at 195 pounds per square inch pressure and at a tempertaure of 622° to 612° F. reactor outlet temperature.

It will be noted that after regeneration the feed rate and the pressure were increased while the temperature was decreased.

In another operation, a West Texas gas oil was hydrofined over a catalyst such as has been described herein at a feed rate of 11,180 barrels per day at a space velocity of 1.85 v./v./hr., at a reactor outlet temperature of 660° F., and at a pressure ranging from 90 to 127 pounds per square inch gauge. Before regeneration the pressure drop across the reaction zone had increased to 72 pounds per square inch. The catalyst was then regenerated employing a sufficient amount of air to provide an initial concentration of oxygen of 0.6 mol percent in the air-steam mixture. The temperature during the regeneration rose to a maximum of 1000° F. for a short period of time and sustained temperatures of 970° F. to 990° F. were observed. The oxygen concentration was increased by raising the air rate to provide 0.9 mol percent oxygen in the steam-air mixture. After regeneration the West Texas gas oil was again charged over the catalyst and the pressure drop was found to have been decreased to 20 pounds per square inch gauge. Desulfurizing after regeneration had been improved by about 100% over that experienced prior to regeneration. The data for this regeneration operation as presented in Table III.

Operations of the nature described have restored catalyst activity, which had dropped to about 50% to 60% of original activity, to 85% to 95% of the original catalyst activity. Without this sequence of operations as in this invention, catalyst activity after burning only is about 75% of the original activity. Catalyst activity as used herein means the activity of one catalyst relative to the activity of another catalyst taken as the ratio of feed rates to the two catalysts for equivalent conversion.

Not only does the foregoing treatment restore substantially the catalyst activity but it also reduces the pressure drop through the reaction zones to a remarkable extent; whereas the pressure drops were 50 to 60 pounds per square inch before the regeneration or reaction treatment in accordance with this invention after such treatment was in some instances only 3 to 10 pounds per square inch. This will allow substantial throughputs of feed while treating same with hydrogen in accordance with the

Table III

| Reactor Press. (Approx.) p.s.i.g. | Reactor Bed Temperatures, °F. 1 | 2 | 3 | 4 | Regenerator Furnace Outlet, °F. | Steam Rate Lbs. per Hour | Steam+Air Rate, s.c.f./hr. (60° F., 1 atm.) | Mol Percent O₂ in Mix. |
|---|---|---|---|---|---|---|---|---|
| 20 | 905 | 840 | 720 | 800 | 760 | 13,200 | 275,920 | 0.60 |
|  | 905 | 880 | 820 | 860 | 855 |  |  |  |
|  | 910 | 940 | 820 | 900 | 855 |  |  |  |
|  | 910 | 985 | 860 | 960 | 855 |  |  |  |
|  | 905 | 905 | 860 | 968 | 855 |  |  |  |
| 20 | 905 |  |  |  | 857 | 13,200 | 279,450 | 0.87 |
|  | ---- | 1,000 | 900 | 980 | ---- |  |  |  |
|  | ---- | 990 | 910 | 960 | ---- |  |  |  |
|  | 910 | 930 | 865 | 920 | 857 |  |  |  |
|  | 905 | 920 | 860 | 915 | 856 |  |  |  |
| 20 | 905 | 900 | 850 | 895 | 855 | 13,200 | 279,900 | 0.89 |
|  | 908 | 820 | 750 | 820 | 864 |  |  |  |
|  | 908 | 810 | 740 | 800 | 855 |  |  |  |
|  | 905 | 810 | 850 | 810 | 855 |  |  |  |
| 20 |  |  |  |  | 855 | 13,200 | 279,650 | 0.88 |
|  | ---- | ---- | ---- | ---- | 850 |  |  |  |
|  | 900 | 805 | 740 | 800 | 850 |  |  |  | present invention. Furthermore, in the present invention, using the sequence of operations in the regeneration treatment, the presence of steam, contrary to the prior art, is not detrimental and does not deactivate the catalyst. This makes the invention additionally advantageous and useful.

The present invention has been used commercially in treating gas oil and heating oil hydrocarbons to improve the quality thereof as fuel oils. The regeneration technique has successfully restored the activity of the catalyst over a significant period of time.

The nature and objects of the present invention having been completely described and illustrated, what I wish to claim as new and useful and to secure by Letters Patent is:

1. A method for regenerating and reusing a molybdenum containing catalyst which has become deactivated by deposition of about 5% to about 10% by weight of carbonaceous material thereon in a reaction zone wherein pressure drop has increased substantially in the hydrogen treatment of a petroleum fraction boiling in the gasoline, gas oil and lubricating oil range under hydrofining reaction conditions at a temperature in the range of about 450° to about 750° F. and at a pressure in the range of about 50 to 800 pounds per square inch gauge in which a mixture of hydrogen and said petroleum fraction is contacted with said catalyst for a time from about 1 to about 6 months, said hydrogen being employed in an amount in the range from about 200 to about 2,000 standard cubic feet per barrel of said fraction, and said fraction being contacted with said catalyst at a space velocity in the range from about 0.25 to about 10 volumes of said fraction per volume of catalyst per hour which comprises discontinuing contact of said catalyst with said petroleum fraction and continuing the contact of said catalyst with said hydrogen for a time of about 1 hour sufficient to remove any of said petroleum fraction remaining on said catalyst in a liquid phase, thereafter contacting the catalyst with steam for about two hours until the catalyst is free of said petroleum fraction, increasing the amount and temperature of the steam in contact with the catalyst until a temperature of approximately 850° F. is attained by the catalyst, burning carbonaceous material from said catalyst in a combustion operation at a temperature no greater than approximately 1000° F. by providing in said steam a sufficient amount no greater than about 1 mol percent of free oxygen to remove said carbonaceous material from the catalyst, removing oxygen from said steam and continuing the contact of said catalyst with steam for approximately 30 minutes, contacting said burned catalyst with hydrogen while reducing the temperature of the catalyst to a temperature in the range of about 450° to 750° F., and then again contacting said catalyst with a mixture of hydrogen and said petroleum fraction for a time from about 1 to about 6 months under said hydrofining reaction conditions at a substantial reduction in pressure drop, said hydrogen contacting being conducted at a pressure in the range of about 150 to about 225 pounds per square inch and the steaming and burning being conducted at a pressure in the range of about 10 to about 50 pounds per square inch.

2. A method in accordance with claim 1 in which the total time for said regeneration is approximately 24 hours.

3. A method in accordance with claim 1 in which the catalyst is molybdenum oxide on substantially silica-free alumina.

4. A method in accordance with claim 1 in which the catalyst is cobalt molybdate on substantially purified alumina.

5. A method in accordance with claim 1 in which the catalyst is molybdenum sulfide on alumina.

6. A method in accordance with claim 1 in which the catalyst is molybdenum blue on alumina.

7. A method for regenerating and reusing a molybdenum containing catalyst which has become deactivated by deposition of about 5% to about 10% by weight of carbonaceous material thereon in a reaction zone wherein pressure drop has increased substantially in the hydrogen treatment of a petroleum fraction boiling in the gasoline, gas oil and lubricating oil range under hydrofining reaction conditions at a temperature in the range of about 450° to about 750° F. and at a pressure in the range of about 50 to about 800 pounds per square inch gauge in which a mixture of hydrogen and said petroleum fraction is contacted with said catalyst for a time from about 1 to about 6 months, said hydrogen being employed in an amount in the range from about 200 to about 2,000 standard cubic feet per barrel of said fraction, and said fraction being contacted with said catalyst at a space velocity in the range from about 0.25 to about 10 volumes of said fraction per volume of catalyst per hour which comprises discontinuing contact of said catalyst with said petroleum fraction and continuing the contact of said catalyst with said hydrogen while reducing the temperature of the catalyst to a temperature in the range of about 400° to about 600° F. for a time of about 1 hour sufficient to remove any of said petroleum fraction remaining on said catalyst in a liquid phase, thereafter contacting the catalyst with steam while further reducing the temperature of the catalyst to a temperature in the range of about 330° to about 500° F. for about 2 hours until the catalyst is free of said petroleum fraction, increasing the amount and temperature of the steam in contact with the catalyst until a temperature of approximately 850° F. is attained by the catalyst, burning carbonaceous material from said catalyst in a combustion operation at a temperature no greater than approximately 1000° F. by providing in said steam a sufficient amount no greater than about 1 mol percent of free oxygen to remove said carbonaceous material from the catalyst, removing oxygen from said steam and continuing the contact of said catalyst with steam for approximately 30 minutes, contacting said burned catalyst with hydrogen and again reducing the temperature of the catalyst to a tempertaure in the range of about 450° to about 750° F., and then again contacting said catalyst with a mixture of hydrogen and said petroleum fraction for a time from about 1 to about 6 months under said hydrofining reaction conditions at a substantial reduction in pressure drop, said hydrogen contacting being conducted at a pressure in the range of about 150 to about 225 pounds per square inch and the steaming and burning being conducted at a pressure in the range of about 10 to about 50 pounds per square inch.

8. A method for regenerating and reusing a molybdenum containing catalyst which has become deactivated by deposition of about 5% to about 10% by weight of carbonaceous material thereon in a reaction zone wherein pressure drop has increased substantially in the hydrogen treatment of a fuel oil boiling in the gas oil and heating oil range under hydrofining reaction conditions at a temperature in the range of about 500° to about 700° F. and at a pressure in the range of about 50 to about 225 pounds per square inch gauge in which a mixture of hydrogen and petroleum fraction is contacted with said catalyst for a time from about 1 to about 6 months, said hydrogen being employed in an amount in the range from about 200 to about 2,000 standard cubic feet per barrel of said fraction, and said fraction being contacted with said catalyst at a space velocity in the range from about 0.25 to about 10 volumes of said fraction per volume of catalyst per hour which comprises discontinuing contact of said catalyst with said petroleum fraction and continuing the contact of said catalyst with said hydrogen for a time of about 1 hour sufficient to remove any of said petroleum fraction remaining on said catalyst in a liquid phase, thereafter contacting the catalyst with steam for about 2 hours until the catalyst is free of said petroleum fraction, increasing the amount and temperature of the steam in contact with the catalyst until a temperature of approximately 850° F. is attained by the catalyst, burning carbonaceous material from said catalyst in a combustion operation at a temperature no greater than approximately 1000° F. by providing in said steam a sufficient amount no greater than about 1 mol percent of free oxygen to remove said carbonaceous material from the catalyst, removing oxygen from said steam and continuing the contact of said catalyst with steam for approximately 30 minutes, contacting said burned catalyst with hydrogen while reducing the temperature of the catalyst to a temperature in the range of about 500° to about 700° F., and then again contacting said catalyst with a mixture of hydrogen and said fuel oil for a time from about 1 to about 6 months under said hydrofining reaction conditions at a substantial reduction in pressure drop, said hydrogen contacting being conducted at a pressure in the range of about 150 to about 225 pounds per square inch and the steaming and burning being conducted at a pressure in the range of about 10 to about 50 pounds per square inch.

References Cited in the file of this patent

UNITED STATES PATENTS

| | | |
|---|---|---|
| 2,290,845 | Voorhees | July 21, 1942 |
| 2,344,770 | Gunness | Mar. 21, 1944 |
| 2,570,067 | Myers | Oct. 2, 1951 |
| 2,867,579 | Loughran et al. | Jan. 6, 1959 |
| 2,878,180 | Watkins et al. | Mar. 17, 1959 |